W. S. Sampson, Grain Cars.
No. 120,109.    Patented Oct. 17, 1871.
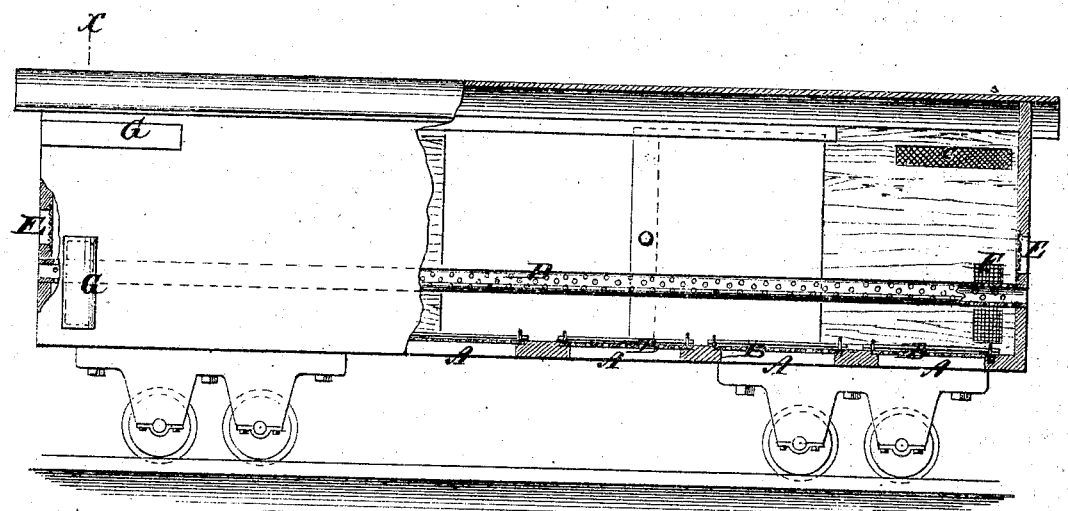
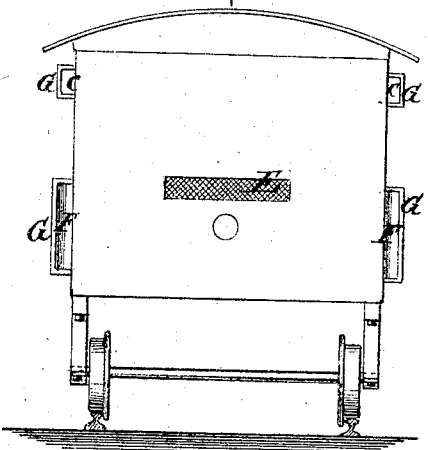 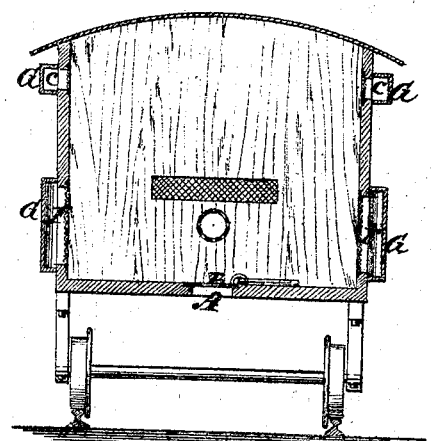
Witnesses:
Geo. W. Mabee
Frank Blockley
Inventor:
W. S. Sampson
per Munn & Co
Attorneys.

UNITED STATES PATENT OFFICE.

WILLIAM S. SAMPSON, OF NEW YORK, N. Y., ASSIGNOR TO HIMSELF, RUTH ANN VAN BUNSCHOTEN, AND HARRIET VAN BUNSCHOTEN, OF SAME PLACE.

IMPROVEMENT IN VENTILATING GRAIN-CARS.

Specification forming part of Letters Patent No. 120,109, dated October 17, 1871.

*To all whom it may concern:*

Be it known that I, WILLIAM S. SAMPSON, of the city of New York, in the county and State of New York, have invented new and useful Improvements in Grain-Cars; and I do hereby declare that the following is a full, clear, and exact description thereof, which will enable others skilled in the art to make and use the same, reference being had to the accompanying drawing forming part of this specification.

This invention relates to improvements in freight-cars for the transportation of grain and other vegetable products or fruit in bulk, and has for its object the preservation of the same from the damaging effects of confinement in bulk without air circulation; also, to improve the condition of the grain or other articles while in transit when shipped in a damp condition. The invention consists in providing the cars with means to cause a free circulation of fresh air throughout the grain, and the space above it, if any, to supply the grain or other article with fresh air having sufficient activity to carry off the moisture and heat emanating from the grain, which is always more or less damp, and which is the cause of the fermentation and decay of the confined grain.

At the present time the great quantities of grain shipped from the interior of the country to the seaboard and across seas are carried in bulk in close cars, or in boats or vessels, and are almost always injured more or less by the exclusion of air, which is so necessary for the preservation of such products. Owing to the vast quantities shipped, the bulkiness of the article, expense of storing room, and facilities for drying, cleaning, and preserving the grain, and also owing to the limited means of shipment and the haste with which it is necessary, for various reasons, to get the grain to market, it is much neglected in respect of its condition as to dryness after once having been started on the way to market; and vast quantities are shipped in a damp condition, in consequence of which, when arrived in the markets, a large proportion has greatly depreciated in quality and value, so that besides the actual loss in money value, which falls ultimately mainly on the producer, the consumer is subjected to the necessity of using inferior or injured food. Now, I propose not only to obviate these evils, but to cause the grain and other articles to be actually improved while in transit, and that, too, by taking advantage of the natural facilities offered by the moving car, and without additional expense, except, perhaps, an unimportant trifle in the first cost of cars; also without additional attendance.

Figure 1 represents a side view of a car, partly in elevation and partly in section, showing several ways of causing the circulation of air through the grain while contained in it. Fig. 2 is an end view, and Fig. 3 is a transverse section taken on the line $x\ x$ of Fig. 1.

Similar letters of reference indicate corresponding parts.

I propose to provide such ventilating-flues and passages that the motion of the car will cause the air to be forced in at the end, sides, or bottom, or either alone, and to pass through the grain, especially from the bottom upward, and to escape in the same manner, thereby continually supplying fresh air and exhausting that in contact with the grain, by which the heat and dampness or vapors will be carried away and prevented from accumulating, as is now the case. It is especially desirable that the air enter the grain at or near the bottom and rise upward, for that is the natural course of the vapors and gases generated in the grain when confined. This may be caused in various ways; for instance, the bottom of the car may have numerous openings A, admitting the air, and covered by wire-cloth B, perforated sheet metal, or other substance, which will prevent the loss of the grain, while admitting the air; and the ends of the car may have, above the grain, escape-passages C, which will allow the air to rise up through the grain, and escape in currents, having such force as will be due to the motion of the cars, or the same in combination with the motion of the exterior atmosphere. But, instead of this arrangement of the openings through the bottom of the car, I may employ one or more perforated tubes, D, extending from end to end, to receive the air and distribute it to the grain through the perforations, the said pipes either being closed at the rear end or not, as preferred or found best, and either arranged on the bottom of the car or above it. These perforated pipes may also be used in conjunction with the openings at the bottom; or, again, the air may be admitted through the openings E at the ends and F at the sides, near the ends, below the surface of the grain, the said openings being protected by suitable reticulated substance, and these may be used either with or without the other arrangements These end openings at the sides may have hoods arranged to cause a suction at the advancing end of the car and a vacuum at the rear end, as found best.

In this way grain or other vegetable substances or fruit shipped in a damp condition may, as I have practically demonstrated, be not only preserved while in transit, but actually improved in condition; whereas, at the present time, it is often found necessary to move the cargo of grain from the car before arriving at the end of the route, and subject it to the action of grain-drying machinery to prevent it from being ruined.

The car may have a bottom made of wire-cloth or other reticulated substance, which will hold the grain and admit the air throughout the whole surface; and to adapt such cars for carrying other freight they may have closed bottoms arranged above these wire bottoms, divided longitudinally at the center, and hinged to the sides, so that they will fall down upon the wire bottom and cover it; and when raised for placing the grain on the open bottom they will close the space at the openings in the sides of common freight-cars as high as desired for grain, and serve as doors for the said spaces. Instead of depending on the currents of air generated by the motion of the cars or on the natural currents, I also propose to impel the air by fans, pumps, or other blowing apparatus, and to operate them by any suitable connection with the turning gear of the cars or by the working parts of the locomotive.

It is obvious that this improvement is applicable alike to vessels and boats or other means of transportation simply by making suitable variations in the connecting apparatus required by the nature of the case, and I propose to make such application of it.

Having thus described my invention, I claim as new and desire to secure by Letters Patent—

1. A grain-car having wire-covered inlet-openings A B in the bottom and outlet-openings C near the top, applied in combination with the perforated pipe D, as and for the purpose described.

2. One or more perforated tubes D, open at each end, arranged longitudinally in a grain-car to draw the air through as the car moves, and disseminate it among the grain, as and for the purpose set forth.

3. The openings E E in front and rear of the car, to produce a draught, and the perforated pipe D, combined with side and bottom openings A F C, to induce lateral currents of air therefrom, and thereby aerate the grain in all parts.

The above specification of my invention signed by me this 24th day of May, 1870.

WILLIAM S. SAMPSON.

Witnesses:
  GEO. W. MABEE,
  L. S. MABEE. (166)